United States Patent
Kourtakis et al.

(10) Patent No.: US 6,630,078 B2
(45) Date of Patent: Oct. 7, 2003

(54) RETICULATED CERAMIC FOAM CATALYSTS FOR SYNTHESIS GAS PRODUCTION

(75) Inventors: Kostantinos Kourtakis, Swedesboro, NJ (US); Anne M. Gaffney, West Chester, PA (US); Lin Wang, Wilmington, DE (US)

(73) Assignee: ConocoPhillips Company, Houston, TX (US)

( * ) Notice: Subject to any disclaimer, the term of this patent is extended or adjusted under 35 U.S.C. 154(b) by 150 days.

(21) Appl. No.: 09/785,626

(22) Filed: Feb. 16, 2001

(65) Prior Publication Data

US 2002/0009407 A1 Jan. 24, 2002

Related U.S. Application Data

(60) Provisional application No. 60/183,576, filed on Feb. 18, 2000.

(51) Int. Cl.[7] .................................................. C01B 3/26
(52) U.S. Cl. ................................. 252/373; 502/527.24
(58) Field of Search .......................................... 252/373

(56) References Cited

U.S. PATENT DOCUMENTS

| | | | | |
|---|---|---|---|---|
| 4,253,992 A | * | 3/1981 | Soejima et al. | |
| 4,810,685 A | | 3/1989 | Twigg et al. | ................. 502/60 |
| 5,648,582 A | | 7/1997 | Schmidt et al. | ............. 585/652 |
| 5,654,491 A | | 8/1997 | Goetsch et al. | .......... 568/469.9 |
| 5,720,901 A | * | 2/1998 | De Jong et al. | ............ 252/373 |
| 6,007,781 A | | 12/1999 | Campbell et al. | ............ 422/122 |

FOREIGN PATENT DOCUMENTS

| | | | | |
|---|---|---|---|---|
| DE | 19851041 A1 | 12/1999 | ............ | B01J/35/04 |
| EP | 0588691 A1 | 9/1983 | ............ | B01J/23/10 |
| EP | 0260826 | 8/1987 | ............ | B01J/23/10 |
| EP | 0303438 | * | 2/1989 | |
| EP | 05438022 A2 | 5/1991 | ............ | B01J/23/10 |
| WO | WO 96/16737 | 6/1996 | ............ | B01J/35/00 |
| WO | WO 97/19753 | 6/1997 | ............ | B01J/35/04 |

OTHER PUBLICATIONS

Maoqiang Li, Shuying Zhang and Ruilian Yang; *The Key Technique of Manufacture of Dense Chromium Sesquioxide Refractories*; China's Refractories, vol. 7, No. 3, 1998. (No month).

J.A. Ceram. Soc., 78(8) 2271–73 (1995); *Hot Isostatic Pressing and Characterization of Sol–Gel–Derived Chromium (iii) Oxide*; A. Kawabata, M. Yoshinaka, K. Hirota and O. Yamaguchi. (No month).

Journal of Ceramic Soc. Of Japan, Int. Edition; Hashimoto, S. et al;*Sintering characteristics in the System MgO–$Cr_2O_3$ and Formation of* $(Mg_{8-x}Crx)$ $(0 \leq X \leq 2.88)$; vol. 104–1130. (No date).

Journal of the European Ceramic Soc. 19 (1999) 399–405; 1999 Elsevier Scient Limited; T. Li et al; *Sintering of $Cr_2O_3$ in $H_2/H_2O$ Gas Mixtures*. (No month).

British Ceramic Transaction 1995 vol. 94, No. 3 97; *Densification and Grain Growth in Sintered Alumina–Chromia powder Mixtures*; A Harabi and T. J. Davies. (No month).

(List continued on next page.)

Primary Examiner—Wayne A. Langel
(74) Attorney, Agent, or Firm—Conley Rose, P.C.

(57) ABSTRACT

Reticulated ceramic monolithic catalysts and non-poisoning catalyst supports comprising one or more metal oxides of chromium, cobalt, nickel, an alkaline earth, a rare earth, or another sinterable metal oxide that are active in any of various chemical oxidation reactions are disclosed. Methods of making the new reticulated ceramic structures comprising impregnating an organic foam or other pore-templating material are also disclosed. Processes for the catalytic conversion of light hydrocarbons to products comprising carbon monoxide and hydrogen employing reticulated ceramic catalysts are described.

44 Claims, 1 Drawing Sheet

OTHER PUBLICATIONS

J. Am. Ceram. Soc 77 [6]1467–72 (1994); David Brown and David J. Green; *Investigation of Strut Crack Formation in Open Cell Alumina Ceramics*. (No month).

Ceramic Processing Science and Technology; T. Li, et al; *Reaction–Bonding of $Cr_2O_3$ Ceramics*. (No date).

Ceramic Processing Science and Technology; Rolf Wasche, et al; *Sintering and Characterisation of Gelcast Alumina–Chr9omia Reaction Bonded Ceramics*. (No date).

NanoStructured Materials, vol. 5, No. 5, pp. 505–512, 1995; Elsevier Science Ltd.; U. Balachandran et al.; *Synthesis, Sintering, and Magnetic Properties of Nanophase $Cr_2O_3$*. (No month).

PCT International Search Report dated Jul. 9, 2001.

Journal of Catalysis 138, 267–282 (1992) *Synthesis Gas Formation by Direct Oxidation of Methane*, D.A. Hickman and L.D. Schmidt. (No month).

\* cited by examiner

RETICULATED CERAMIC FOAM CATALYSTS FOR SYNTHESIS GAS PRODUCTION

CROSS-REFERENCE TO RELATED APPLICATIONS

This application claims the benefit under 35 U.S.C. 119(e) of U.S. Provisional Application No. 60/183,576 filed Feb. 18, 2000.

BACKGROUND OF THE INVENTION

1. Field of the Invention

The present invention generally relates to catalysts for converting light hydrocarbons (e.g., methane) to products containing carbon monoxide and hydrogen (synthesis gas). More particularly, the invention relates to macroporous monolithic self-supported active catalyst structures and to non-poisoning catalyst support structures having a high surface-area-to-volume ratio.

2. Description of Related Art

The catalytic partial oxidation of light hydrocarbons, such as $C_1$–$C_5$ hydrocarbons, to yield products containing a mixture of carbon monoxide and hydrogen ("synthesis gas" or "syngas") is currently an area of intense interest and investigation. Much of the work in this field has been described in the literature. One focal point of this research is on methane, the main component of natural gas, as a starting material for the production of higher hydrocarbons and hydrocarbon liquids in order to improve the economics of natural gas use. This is due to the fact that there is a great deal of natural gas available in many areas of the world, and the world's natural gas supply is predicted to outlast the world's oil reserves by a significant margin. Most of the world's natural gas supply is situated in areas that are geographically remote from population and industrial centers, however. The costs of compression, transportation, and storage make the commercial use of natural gas economically unattractive. At the present time, commercial production of synthesis gas by methane conversion primarily utilizes steam reforming processes, which result in a similar gas product mixture to that obtained by partial oxidation of methane. Conventional steam reforming processes are well described in the literature.

In catalytic partial oxidation processes the gaseous hydrocarbon feedstock is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 1.

$$CH_4 + 1/2 O_2 \rightleftharpoons CO + 2H_2 \quad (1)$$

This product ratio is especially desirable for such downstream applications as the conversion of the syngas to methanol, or conversion to hydrocarbon products such as fuels boiling in the middle distillate range (e.g. kerosene and diesel fuel) and hydrocarbon waxes by processes such as the Fischer-Tropsch Synthesis. The partial oxidation of methane is an exothermic reaction and proceeds at a faster rate than the older steam reforming processes for producing syngas. Shorter catalyst contact times and reduced scale reactors to accomplish partial oxidation of a hydrocarbon feedstock are some of the improvements made possible by a catalytic partial oxidation process.

The selectivities of catalytic partial oxidation to the desired products, carbon monoxide and hydrogen, are controlled by several factors, but one of the most important of these factors is the choice of catalyst composition. Typically, the best catalyst compositions have included precious metals and/or rare earths. The large volumes of expensive catalysts needed by typical catalytic partial oxidation processes have placed these processes generally outside the limits of economic justification, however. For successful operation at commercial scale, the catalytic partial oxidation process must be able to achieve a high conversion of the methane feedstock at high gas hourly space velocities (GHSV), and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted to the development of highly active catalysts allowing commercial performance without coke formation.

A number of process regimes have been described in the literature for the production of syngas via catalyzed partial oxidation reactions. The noble metals, which typically serve as the best catalysts for the partial oxidation of methane, are scarce and expensive. The widely used, less expensive, nickel-based catalysts have the disadvantage of promoting coke formation on the catalyst during the reaction, which results in loss of catalytic activity. Moreover, in order to obtain acceptable levels of conversion of gaseous hydrocarbon feedstock to CO and $H_2$ it is typically necessary to operate the reactor at a relatively low flow rate, or gas hourly space velocity, using a large quantity of catalyst.

U.S. Pat. No. 4,810,685 (assigned to Imperial Chemical Industries PLC) discloses certain steam reforming catalysts containing strong ceramic foams comprising at least 50% by weight, of oxides of Fe, Co, Ni, Cu, Va, Mo, W, Cr, Mn or Zn. EPO 303,438 (assigned to Davy McKee Corporation) describes certain syngas catalysts that provide surface area to volume ratio of 5 $cm^2/cm^3$ to about 40 $cm^2/cm^3$. For example, high surface area alumina is deposited on a honeycomb monolith of cordierite material to serve as a support upon which finely dispersed catalytic metal components such as Pt and Pd are distended.

U.S. Pat. No. 5,648,582 (assigned to Regents of the University of Minnesota) discloses a process for the catalytic partial oxidation of methane at space velocities of 800,000 to 12,000,000 $hr^{-1}$ on certain Rh, Ni and Pt catalysts supported by a ceramic monolith. The small catalyst bed used in this process is said to eliminate hot spots which are typical of relatively thick catalyst beds.

Short contact time, reduced scale catalytic partial oxidation processes for producing syngas from methane require highly active catalysts and support structures that can function for a long period of time under the required high temperature and high pressure operating conditions. Most supported catalysts with good activity and high porosity tend to break down rapidly on-stream, however. Another problem that is encountered in many methane oxidation processes employing supported catalysts is that the porous support "poisons" the active catalyst. The poison is a component that is not present on the active catalyst overlayer and which affects catalyst performance in some way. In many cases, the poison interferes with the performance of the catalyst. Chemical interactions between the oxides of the group VIII transition metals and the reactive components of the support lead to the formation of catalytically inactive binary oxide phases. The catalytic phase purity is disrupted, or poisoned. For example, nickel forms nickel aluminate over an (α-aluminate support. Some catalyst structures employ diffusion barriers between the active catalyst and the support structure in an attempt to ameliorate this problem.

Others have described processes pertaining to the sintering of chromium oxide, but the resulting sintered chromium oxide products are not suitable structures for use as syngas generation catalysts. For example, T. Li, et al. (1999 *J. Eur. Ceram. Soc.* 19:399–405) discloses a method of sintering $Cr_2O_3$ in $H_2/H_2O$ gas mixtures. M. Li, et al. (1998 *China's Refract.* 7:11–13) describes a key technique of manufacture of dense chromium sesquioxide refractories. S. Hashimoto, et al. (1996 *J. Ceram. Soc.* 104:1121–1124) describes densely sintered, compacted MgO and $Cr_2O_3$ powders. M. Yoshinaka, et al. (1995 *J. Am. Ceram. Soc.* 78:2271-3) describe a hot isostatic pressed sol-gel derived chromium (III) oxide. A. Harabi, et al. (1995 *Br. Ceram. Trans.* 94:97–102) describe densification and grain growth in sintered alumina-chromia powder mixtures. Loss of chromia was substantial in compacts with more than 10 wt % chromia. U. Balachandran et al. (1995 *Nanostruct. Mater.* 5:505–12) describe the synthesis, sintering and magnetic properties of a nanophase $Cr_2O_3$ composition. R. Waesche, et al. (1995 *Ceram. Trans.* 51:531–5) describe the sintering and characterization of certain gelcast alumina-chromia reaction bonded ceramics. T. Li, et al. (1995 *Ceram. Trans.* 51:231–5) describes a process for making reaction-bonded $Cr_2O_3$ ceramics.

What is needed are economical, yet highly active catalyst structures that permit short contact time and high flow rates on stream without causing excessive back pressure and without deteriorating under operational temperature and pressure conditions. Superior syngas catalysts, for example, need to possess macroporosity (to minimize back pressure), thermal heat resistance and mechanical strength for use at high volumetric flow rates. The catalyst should also be free of interfering chemical interactions with the support material.

SUMMARY OF THE INVENTION

Conventional catalysts or catalyst support structures, particularly those employed for catalyzing the conversion of light hydrocarbons (such as methane) to synthesis gas, do not include free standing Cr oxide foams or reticulated ceramics. The active catalyst structures, catalyst supports and syngas production methods of the present invention are able to overcome some of the shortcomings of previous catalysts and syngas production processes by permitting short contact time of the reactant gases with the catalyst bed, and allowing high flow rates of reactant and product gases. Due to the favorable structure of the catalyst, or catalyst support, this is accomplished without causing excessive back pressure. The new catalysts and supports resist deterioration under operational temperature and pressure conditions better than typical catalysts in use today for syngas production. The preferred new catalysts comprise reticulated ceramic structures, preferably ceramic foams, and demonstrate excellent levels of conversion of methane and oxygen reactants and selectivities for CO and $H_2$ products by a predominantly, or net partial oxidation reaction.

According to certain embodiments, the reticulated foam catalyst contains one or more metal oxides of chromium, cobalt, nickel, an alkaline earth, a rare earth, or another sinterable metal oxide that is active in any of various chemical oxidation reactions, preferably the catalytic partial oxidation of methane to synthesis gas.

In certain preferred embodiments of the catalysts of the present invention, chromium-containing macroporous three-dimensional structures, or monoliths are provided which are self-supporting chromium-containing catalysts made of reticulated ceramic materials or three-dimensional ceramic foams.

Preferred methods of making the chromium oxide-containing catalysts include processing a chromium oxide powder in a reducing atmosphere to avoid production and evolution of volatile chromium compounds (e.g., $CrO_3$) during heating.

In some embodiments of the new catalysts, catalyst structures comprising a higher surface area active catalyst phase formed on top of a preformed reticulated ceramic foam are provided.

In other embodiments of the new catalysts, less active or non-catalytically active monoliths comprising reticulated ceramic materials, or three-dimensional ceramic foams, containing one or more metal oxides of chromium, aluminum, zirconium, titanium, magnesium, cobalt, nickel and silicon are provided. These structures serve as non-poisoning supports for active or more active catalyst materials for various oxidations, including methane oxidation to synthesis gas. Another aspect of the present invention is a process or method of making the above-described catalysts and support structures.

Yet another aspect of the invention comprises a process or method of converting a gaseous methane or other light hydrocarbon feedstock, together with an oxygen source and, optionally, nitrogen, catalyzed by one of the above-described catalysts, to yield a product containing a mixture of carbon monoxide and hydrogen gases. Still other embodiments and advantages of the present invention will appear from the following description.

DETAILED DESCRIPTION OF PREFERRED EMBODIMENTS

Figure 1:
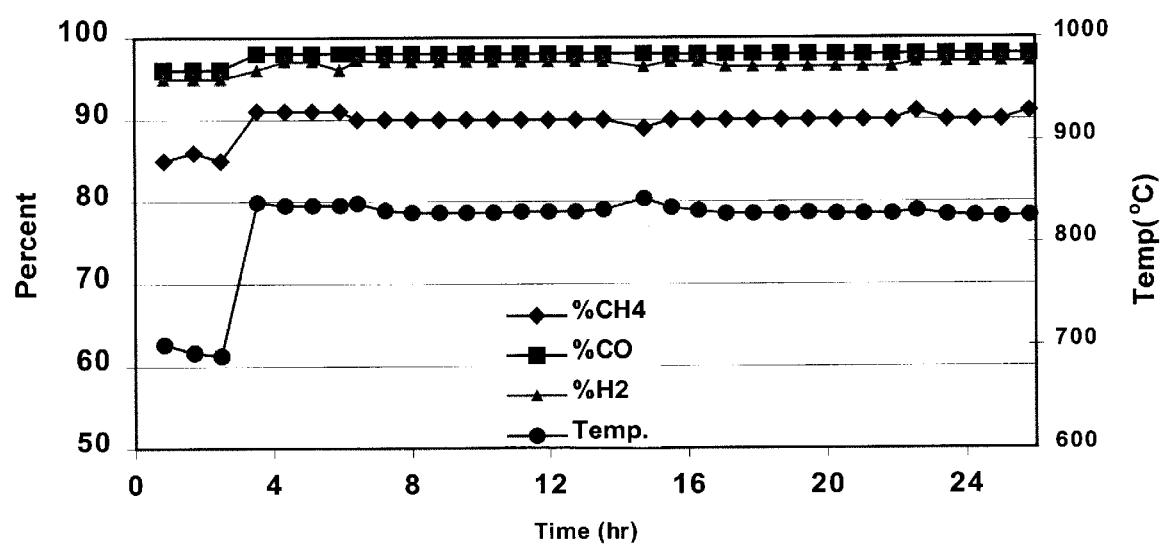
FIG. 1 is a graph showing the on-stream life over a test period of more than 24 hrs of a representative NiO,MnO, MgO foam catalyst bed.

Methods of making macroporous monolithic, self-supporting active catalyst structures and non-poisoning catalyst support structures having a high surface-area-to-volume ratio (preferably 0.1–250 $m^2/g$ measured by $N_2$ BET) are described in the following examples. As explained in more detail below, the active catalytic monoliths or non-poisoning supports are formed by calcining a salt solution of chromium, cobalt, nickel, manganese, molybdenum, tungsten, tin, rhenium, bismuth, indium or phosphorus, forming a solution or slurry of the calcined material and impregnating an organic pore-templating material. The impregnating solution or slurry may also include metal oxides chosen from the group consisting of an oxide of chromium, cobalt, nickel, alkaline earth, rare earth, or other sinterable metal oxide that is capable of catalyzing an oxidation reaction.

Porous catalysts containing chromium oxide as a major component, in particular, have not been described previously. The inventors have discovered that processing of $Cr_2O_3$ to make a chromium oxide reticulated foam requires a significant variation from conventional metal oxide foam forming methods. As some of the following comparative examples will show, processing in air will not form a self-sustaining structure. The new chromium oxide reticulated ceramic three-dimensional structures are processed in a reducing atmosphere to form a mechanically strong and catalytically useful structure. The new chromium-containing reticulated ceramic catalysts and non-poisoning supports, as well reticulated ceramic monoliths containing metal oxides other than chromium have been evaluated for their catalytic activity in syngas production processes.

A non-poisoning ceramic foam support may have a similar or identical composition to that of a higher surface area, active catalyst layer supported on it. In such case, the support is non-poisoning because, since it has the same composition as the active phase, no additional elements or phases are introduced into the catalyst layer as a consequence of interdiffusion at calcination temperatures, or at the temperatures of the syngas or other millisecond contact time reactions. This non-poisonous feature also makes these reticulated ceramic three-dimensional structures useful as active catalysts and catalyst supports for applications other than syngas production.

In the following examples, the metal components of the catalyst compositions are given in atomic ratios of the total metal content, unless otherwise indicated.

EXAMPLE 1

$Cr_2O_3$ Foam

Comparative Example

A $Cr_2O_3$ ceramic foam was prepared using a $Cr_2O_3$ powder which had been calcined in air. An aqueous solution of $Cr_3(OH)_2(CH_3CO_2)_7$ (100 mL, 2.5603 M) was added to a 150 mL petri dish and rapidly frozen with liquid nitrogen. The frozen solid was dried under vacuum for several days (approximately 7 days) to produce a freeze dried powder. The freeze dried material was heated in air at 350° C. for 5 hours and 525° C. for 1 hour prior to use. The resulting powder was then formed into a 3-D monolith structure by impregnating a polyurethane foam with an aqueous slurry or solution containing the powder (i.e., the active catalyst precursor). A technique such as that described by Brown and Green (*J. Am. Ceram. Soc.* 1994. 77:1467–72) for the "polymer foam replication process" was used to prepare the slurry and to load the pore-templating material, such as polyurethane foam. During impregnation the foam pores were filled with slurry and any excess slurry was filtered off (similar to the foam loading technique described in example 6 of U.S. Pat. No. 4,810,685.) The slurry may also include a dispersant, binder or wetting agent to facilitate loading. The loaded polyurethane foam was dried at about 110–120° C. and calcined at a low temperature (i.e., about 800° C.) in air to remove the polyurethane foam to yield a "green" reticulated ceramic. A final, higher temperature calcination (i.e., 1000–1600° C.) was applied to sinter the material and impart mechanical strength. As a result of its being prepared by calcination in an oxidizing atmosphere, however, the resulting foam was friable, crumbled upon handling, and proved to be completely mechanically unstable.

A procedure identical to Example 1 was repeated, except that a temperature of 1,610° C., in air, was used to densify the material. The resulting material was also friable and crumbled upon handling.

EXAMPLE 2

$Co_{0.2}Cr_{0.8}Ox$ Foam

Comparative Example

A $Co_{0.2}Cr_{0.8}Ox$ ceramic foam was prepared using a $Co_{0.2}Cr_{0.8}Ox$ starting material powder, prepared as follows: $Co(NO_3)_2.6 H_2O$ (Aldrich) 167.60 g was dissolved in water. To that solution, 900 ml of 2.5603 M solution of $Cr_3(OH)_2(CH_3COO)_7$ (Aldrich, 31810-8) was added. The final powder was heated at a rate of 5° C./min to 350° C., allowed to soak at 350° C. for 5 hours, and then heated to 525° C. (5° C./min), and allowed to soak at 525° C. for one hour in air. The resulting powder was then formed into a monolith by impregnating a polyurethane foam, as described in Example 1. Similar to the $Cr_2O_3$ ceramic foam, this material was also completely unstable with respect to handling, as it was also friable and readily crumbled.

In a similar study, an identical procedure as described in the foregoing paragraph was employed, except that the powder was milled prior to impregnating it into the polyurethane foam. Powder was hand ground to a particle size, d50=14.7 micrometers in diameter (i.e., 50 volume % of the powder is <14.7 micrometers in diameter), and ball milled in the aqueous slurry to approximately d50=2.3 micrometers, with 14 volume % <1 micrometer. All particle size measurements in this and subsequent examples were performed using laser scattering on a Horiba LA900 Particle Size analyzer. The final foam material was heated at 1650° C., for 2 hours in air. Similar to the $Cr_2O_3$ ceramic foam, this material was also completely unstable with respect to handling, as it was also friable and readily crumbled.

In another study like that described above, the powder was ball milled for an additional 24 hours to produce a particle size of d50=1.0 micrometers, with 48 volume % below 1 micrometer in diameter. The final foam material was heated at 1650° C., for 2 hours in air. Similar to the $Cr_2O_3$ ceramic foam, this material was also completely unstable with respect to handling. It was friable and readily crumbled.

EXAMPLE 3

0.2% $Ni_{0.2}Cr_{0.8}$/Cordierite Ceramic Foam

Comparative Example

A $Ni_{0.2}Cr_{0.8}$/Cordierite ceramic foam approximately 0.2 wt % (as the oxides of nickel and cobalt) was prepared as follows: 1.0120 g of a mixed solution containing 1:4 molar ratio, Ni:Cr (prepared by mixing 7.1043 ml of 0.033782 M $(Cr_3(OH)_2(CH_3COO)_7$ (Aldrich, 31,810-8) with 0.0561 ml of 1.068 M $Ni(NO_3)_2$ molarity determined by ICP analysis)) was added to corderite honeycomb, 600 cpi, 12 mm OD×10 mm H. The entire honeycomb was rapidly frozen in liquid nitrogen and evacuated for several days and calcined in air according to the following schedule: 5° C./min to 350° C., soak 350° C. 5 hours, 5° C./min to 525° C., soak 525° C. 1 hour, 10° C./min to room temperature.

EXAMPLE 4

2% $Co_{0.2}Cr_{0.8}$ in Corderite Honeycomb

Comparative Example

An approximately 2 wt % $Co_{0.2}Cr_{0.8}$ in Corderite Honeycomb, 400 cpi, 10 mm×12 mm O.D. was prepared as follows: A mixed solution containing 2.9337 g $Co(NO_3)_2.6 H_2O$ (Alfa 11341) dissolved in 15.74 ml of 2.56 M aqueous chromium solution, prepared using $Cr_3(OH)_2(CH_3COO)_7$ (Aldrich, 31810-8). A corderite honeycomb (400 cpi) was loaded with this solution, frozen with liquid nitrogen, and evacuated (freeze dried) for several days. The monolith was then calcined in air according to the following schedule: 5°

C./min to 350° C., soak 350° C. 5 hours, 5° C./min to 525° C., soak 525° C. 1 hour, 10° C./min to room temperature. The weight of the oxides remaining on the monolith constituted about 2 wt % of the total weight.

EXAMPLE 5

$Cr_2O_3$ Ceramic Foam

The identical $Cr_2O_3$ powder, as described in Example 1 was used. However, in contrast to the composition of Example 1, densification of the $Cr_2O_3$ was achieved in this Example by calcination of the foam in a non-oxidizing, inert or reducing atmosphere. An aqueous solution of $Cr_3(OH)_2$ $(CH_3CO_2)_7$ (100 mL, 2.5603 M) was added to a 150 mL petri dish and rapidly frozen with liquid nitrogen. The frozen solid was dried under vacuum for several days (approximately 7 days) to produce a freeze dried powder. The freeze dried material was heated in air at 350° C. for 5 hours and 525° C. for 1 hour prior to use. The resulting powder was then formed into a 3-D monolith structure by impregnating a polyurethane foam with an aqueous slurry or solution containing the powder (i.e., the active catalyst precursor). A technique such as that described by Brown and Green (*J. Am. Ceram. Soc.* 1994. 77:1467–72) for the "polymer foam replication process" was used to prepare the slurry and to load the pore-templating material, such as polyurethane foam. During impregnation the foam pores were filled with slurry and any excess slurry was filtered off (similar to the foam loading technique described in example 6 of U.S. Pat. No. 4,810,685, the disclosure of which is incorporated by reference.) The loaded polyurethane foam was dried at about 110–120° C. and calcined at a low temperature (i.e., about 800° C.) in air to remove the polyurethane foam to yield a "green" reticulated ceramic.

A final, higher temperature heating step in a covered crucible, filled with carbon powder to impart a reducing atmosphere, at 1500–1600° C. for 2 hours was applied to sinter and densify the material and impart mechanical strength. The material, at this point, was not friable, and did not readily crumble upon handling. It possessed sufficient mechanical strength to be used in the millisecond contact time reactor. Processing in this matter to form a $Cr_2O_3$ foam structure constitutes a significant departure from conventional methods of making ceramic foams. The pure $Cr_2O_3$ foam was tested (as a two-piece stack) in a reduced scale syngas production reactor, as described in the section entitled "Test Procedure." No light-off was observed for the $Cr_2O_3$ foam.

The resulting reticulated ceramic foam demonstrated the required macroporosity to minimize back pressure while having sufficient tortuosity, thermal heat resistance and mechanical strength for use at high volummetric flow rates. As shown in the following examples, this chromium oxide foam serves as an excellent, non-poisoning support for more active catalyst compositions. Some preparations of the pure chromium oxide reticulated ceramics possess $N_2$ BET surface areas less than 1 $m^2/g$ (i.e., the material is extremely macro (but not micro or meso) porous.) The preferred catalyst particle surface area ranges from 0.1 to 250 $m^2/g$.

Although a covered crucible filled with carbon powder to impart a reducing atmosphere during the higher temperature heating step is described in the present example, any method that prevents the oxidation of the chromium oxide foam during the high temperature final densification step can be used to produce an acceptable reticulated ceramic structure. Such methods include heating in a reducing atmosphere such as flowing hydrogen, in a vacuum or in an inert atmosphere.

EXAMPLE 6

$Ni_{0.2}Cr_{0.8}$ on Preformed $Co_{0.2}Cr_{0.8}Ox$ foam $Ni_{0.2}Cr_{0.8}$ (1:4, Ni:Cr molar ratio) powder supported on the cobalt/chromium oxide reticulated ceramic foam from Example 18, below, was prepared. A 1:4 molar ratio solution of Ni:Cr prepared by mixing 7.1043 ml of 0.033782 M $(Cr_3(OH)_2(CH_3COO)_7$ (Aldrich, 31,810-8) with 0.0561 ml of 1.068 M $Ni(NO_3)_2$ (molarity determined by ICP analysis)) was diluted by a factor of 10 (2 ml was diluted with water to 20 ml). 0.5366 g of this solution was added to a 12 mm diameter×10 mm H, 80 ppi $Co_{0.2}Cr_{0.8}Ox$ ceramic foam, whose preparation is described below in Example 18. The liquid-loaded foam was frozen with liquid nitrogen and evacuated for several days while frozen. The final material was calcined in air according to the following schedule: 5° C./min to 350° C., soak 350° C. 5 hours, 5° C./min to 525° C., soak 525° C. 1 hour, 10° C./min to room temperature. The foam was tested in a reduced scale syngas production reactor, as described in the section entitled "Test Procedure." The test results are shown in Table 1. This reticulated ceramic foam demonstrated sufficient macroporosity to minimize back pressure while having sufficient tortuosity, thermal heat resistance and mechanical strength for use at high volummetric flow rates.

EXAMPLE 7

$Ni_{0.2}Cr_{0.8}$ on $Cr_2O_3$ Foam

Full Impregnation $Ni_{0.2}Cr_{0.8}$ on $Cr_2O_3$ foam using the $Cr_2O_3$ foam described in Example 5. 10 ml of 1.6575 M of chromium hydroxide acetate $(Cr_3(OH)_2(CH_3COO)_7$, (Aldrich, 31,810-8), was mixed with 3.88 ml of 1.068 M $Ni(NO_3)_2$ solution (molarity checked by ICP analysis). This solution was diluted by a factor of six, so that final molarity of Cr is 0.1990 M, and of Ni is 0.04976 M. At that point, 0.8789 g of a chromium oxide reticulated ceramic foam (80 ppi) was used. 0.5930 g of the solution was added to the ceramic foam, to fill the macropores (fall impregnation). The liquid was allowed to evaporate, and the ceramic piece was then calcined according to the following schedule, in air: 5° C./min to 350° C., soak 350° C. 5 hours, 5° C./min to 525° C., soak 525° C. 1 hour, 10° C./min to room temperature. The final loading of metal oxides was approximately 1.26 wt % ($Ni_{0.2}Cr_{0.8}$ oxide, assuming $Ni^{2+}$ and $Co^{2+}$). The foam was tested (as a two-piece stack) in a reduced scale syngas production reactor, as described in the section entitled "Test Procedure." The test results are shown in Table 1.

EXAMPLE 8

$Ni_{0.2}Cr_{0.8}$ on $Cr_2O_3$ Foam

Cylindrically Impregnated $Ni_{0.2}Cr_{0.8}$ on $Cr_2O_3$ foam was prepared using the same solutions as described in the previous example, and a similar procedure. In this case, however, the outside of the cylindrical ceramic piece was wetted with the solution, but not the center. 0.2014 g of the solution was added to the monolith in this manner. Further processing (i.e., drying, calcination) was identical to that described in the previous example. The final loading of metal oxides is approximately 0.44 wt % ($Ni_{0.2}Cr_{0.8}$ oxide, assuming $Ni^{2+}$ and $Co^{2+}$).

Cr-containing ceramic foams prepared according to the foregoing examples were tested as described in the section entitled "Test Procedure." The results obtained upon testing these composition in a reduced scale syngas production reactor are shown in Table 1.

TABLE 1

| Catalyst | Conditions | % $CH_4$ Conv. | % $O_2$ Conv. | % CO Sel | % $H_2$ Sel | $H_2$:CO Ratio | % $CO_2$ Sel | Run time (hr) |
|---|---|---|---|---|---|---|---|---|
| (Example 4) | | | | | | | | |
| $Co_{0.2}Cr_{0.8}$/Honeycomb | Light-off, 290° C. | Shortly after switch to methane the reactor crashed on over temp | | | | | | |
| 400 cpi, 12 mm O.D. × 10 mm H | | | | | | | | |
| Prep. by freeze dry | | | | | | | | |
| (Example 18) | | | | | | | | |
| Cr/Co foam | light-off, 640° C. 2.5 NLPM, 5 psig | 46 | 100 | 78 | 62 | 1.60 | 22 | 2 |
| 12 mm OD × 10 mm H | Air feed 1117° C. cat. | | | | | | | |
| (Example 6) | | | | | | | | |
| 0.1% $Ni_{0.2}Cr_{0.8}$/Cr foam | $O_2$ feed light-off, 510° C. | 70 | 100 | 93 | 88 | 1.9 | 7 | 3.5 |
| 80 ppi, used foam | 2.5 NLPM, 5 psig | | | | | | | |
| 12 mm OD × 10 mm H | 515° C. PH | | | | | | | |
| Freeze dry prep | 1161° C. catal | | | | | | | |
| (Example 3) | | | | | | | | |
| 0.2% $Ni_{0.2}Cr_{0.8}$/Cordierite | | propane light-off at 750° C., Did not stay ignited at $CH_4$ switch | | | | | | |
| 600 cpi honeycomb | | restart produced the same result | | | | | | |
| 12 mm OD × 10 mm H | Freeze dried | | | | | | | |
| (Example 1) | | | | | | | | |
| $Cr_2O_3$ foam, 80 ppi | | No light-off observed | | | | | | |
| 2 pieces, 10 mm OD × 8 mm H each | | | | | | | | |
| (top) 0.44% (NiCrO$_{1.5}$)/ $Cr_2O_3$ (side impregnated) | $O_2$ feed 2.5 NLPM 5 psig | Light off occurred at 420° C., first attempt failed at $CH_4$ switch. | | | | | | |
| (bottom) 1.26% ($Ni_{0.2}Cr_{0.8}$)/ $Cr_2O_3$ (full impregnation) | 508° C. PH 782° C. catal | Very little conversion detected (trace amounts of $CO_2$, $H_2$, $H_2O$) | | | | | | |

EXAMPLE 9

13% Ni/MgO Foam

A NiO—MgO foam (80 ppi) 10 mm×12 mm OD was prepared from the corresponding powder. $Ni(NO_3)_2 \cdot 6H_2O$ (19.325 g) was dissolved in distilled water (50 mL) to give wet impregnation when mixed with calcined (600° C. for 3 hours) MgO (26.1 g). The slurry was mixed with a spatula, and dried at 110° C., followed by calcining at 800° C. for 2 hours. A portion of the calcined material (15 g) was reduced in flowing hydrogen (about 100 cc/minute) for 4 hours at 800° C. The resulting hydrogen-reduced material was sized to 20–30 mesh (0.84–0.59 mm average diameter) powder. The powder was made into an aqueous solution or slurry and then formed into a monolith by impregnating a polyurethane foam, as described in Example 1. The resulting monoliths were tested in a reduced scale syngas production reactor as described in the section entitled "Test Procedure." The results are shown in Table 2. In Table 2 the percent conversion of $CH_4$ and $O_2$ reactant gases, the product selectivity of CO and $H_2$, the ratio of the product gases and the operating conditions are given for both one piece (10 mm) and two piece (20 mm) beds of NiO—MgO foams.

TABLE 2

NiO—MgO Reticulated Ceramic Foam Fired at 1000° C.

| Catalyst | Temp (° C.) | SLMP | % $CH_4/O_2$ Conv. | % $CO/H_2$ Sel. | $H_2$:CO Ratio |
|---|---|---|---|---|---|
| NiO–MgO foam (10 mm × 12 mm) 1 piece | 771 | 2.5 | 84/100 | 96/95 | 1.98 |
|  | 884 | 7.5 | 89/100 | 98/95 | 1.94 |
| NiO–MgO foam (10 mm × 12 mm) 2 pieces | 693 | 2.5 | 86/100 | 96/95 | 1.98 |
|  | 836 | 7.5 | 91/100 | 98/97 | 1.98 |

Feed: 60% $CH_4$, 30% $O_2$, 10% $N_2$

EXAMPLE 10

3%MN/13%Ni/MgO Reticulated Ceramic Foam

The preparation of the Mn(O)—Ni(O)/MgO powder catalyst was similar to that of Example 9 except that $Mn(NO_3)_2 \cdot 6H_2O$ (4.702 g) was also dissolved in the nickel solution before impregnation of the MgO (25.2 g). The powder catalyst was then prepared by impregnating calcined MgO (Aldrich) with the aqueous solution of Ni nitrate and Mn nitrate followed by drying and calcining, as previously described.

The resulting powder was then formed into a 3-D monolith structure by impregnating a polyurethane foam with a slurry or solution containing the powder, as previously described in Examples 1 and 9, and fired at 1000° C. The final foam monolith, or bulk 3-dimensional form, contained about 80 pores per inch (ppi). The concentration of the nickel nitrate and manganese nitrate solution was such that the final NiO—MnO—MgO foam pieces (12 mm OD×10 mm H) contained 13%Ni, 3%Mn/MgO powder catalyst. Table 3 gives the ICP (inductively coupled plasma) compositional analysis for elemental composition for this foam. FIG. 1 shows $CH_4$ conversion, $CO/H_2$ selectivity, and catalyst temperature with run time (two 10 mm high monoliths were stacked to form a 20 mm high bed). It can be seen that $CH_4$ conversion was constant at 90% and syngas selectivity was constant at 95+%. The bed temperature remained constant below 800° C. for at least 25 hours run time. By contrast, under the same test conditions a honeycomb catalyst of Ni(O), Mn(O),Mg(O) on cordierite (Johnson Matthey EP-5170) consisting of two stacked pieces 12 mm OD×10 mm H ran fairly consistently at 90% $CH_4$ conversion and more than 95% syngas selectivity to about 25 hrs run time. At that point, the bed temperature rose from 850° C. to 1000° C. over the next 10 hours, and the conversion and $H_2$ selectivity declined slightly. This deterioration appears to be attributable to the support effect of the cordierite. (data not shown)

TABLE 3

| Element | Wt % |
|---|---|
| Ni | 11.2 |
| Mn | 2.83 |
| Mg | 47.1 |
| Ca | 0.74 |
| Si | 0.31 |
| Na | 0.18 |
| Ti | 815 ppm |
| Fe | 700 ppm |

EXAMPLE 11

3% Mo/13% Ni/MgO

The preparation of the monolithic catalyst powder was similar to that of Example 9 except that $(NH_4)_2MoO_4$ (1.8386 g) was also dissolved in the nickel solution before impregnation of the MgO (25.2 g). The reticulated foam monolith was prepared as described in Example 9.

EXAMPLE 12

3% W/13% Ni/MgO

The preparation of the catalyst powder was similar to that of Example 9 except that $(NH_4)_2WO_4$ (1.3900 g) was also dissolved in the nickel solution before impregnation of the MgO (25.2 g). The reticulated foam monolith was prepared as described in Example 9.

EXAMPLE 13

3% Sn/13% Ni/MgO

The preparation of the catalyst powder was similar to that of Example 9 except that $SnSO_4$ (1.6281g) was also dissolved in the nickel solution before impregnation of the MgO (25.2 g). The reticulated foam monolith was prepared as described in Example 9.

EXAMPLE 14

3% Re/13% Ni/MgO

The preparation of the catalyst powder was similar to that of Example 9 except that $NH_4ReO_4$ (1.2965 g) was also dissolved in the nickel solution before impregnation of the MgO (25.2 g). The reticulated foam monolith was prepared as described in Example 9.

EXAMPLE 15

3% Bi/13% Ni/MgO

The preparation of the catalyst powder was similar to that of Example 9 except that $Bi(NO_3)_3.5H_2O$ (2.089 g) was also dissolved in the nickel solution before impregnation of the MgO (25.2 g). The reticulated foam monolith was prepared as described in Example 9.

EXAMPLE 16

3% In/13% Ni/MgO

The preparation of the catalyst powder was similar to that of Example 9 except that $In(NO_3)_3.5H_2O$ (3.0641 g) was also dissolved in the nickel solution before impregnation of the MgO (25.2 g). The reticulated foam monolith was prepared as described in Example 9.

EXAMPLE 17

3% P/13% Ni/MgO

The preparation of the catalyst powder was similar to that of Example 9 except that $NH_4H_2PO_4$ (3.3424 g) was also dissolved in the nickel solution before impregnation of the MgO (25.2 g). The reticulated foam monolith was prepared as described in Example 9.

The ceramic foam compositions containing various promoter metals, Ni and MgO, prepared as described in Examples 11–17, are expected to provide similar syngas selectivity and $CH_4$ conversion levels to that of the 3%Mn/13% Ni/MgO reticulated ceramic foam of Example 10, as the corresponding powder catalysts (data not shown) demonstrated similar activities to that of the Mn(O)—Ni(O)/MgO powder catalyst which was employed in making the foam catalyst of Example 10.

EXAMPLE 18

Co—Cr Oxide Reticulated Foam

Co—Cr oxide foam was prepared using $Co_{0.2}Cr_{0.8}$ Ox powder catalyst like that described in Example 2. The powder $Co_{0.2}Cr_{0.8}$ Ox catalyst was prepared by freezing an aqueous solution of the corresponding metal salts with liquid nitrogen, drying the frozen solution in a freeze drier, and calcining, as described in Example 2. The reticulated foam monolith was prepared as described in Example 2, except in the case of this chromium oxide system, a reducing atmosphere was maintained during the densification or sintering step in order to prevent the formation of volatile $CrO_3$, as described for Example 5. The powder was ball milled to a particle size range (d50 of about 2 micrometers). The final material was densified by heat at 1600° C., for 2 hours, in a covered crucible containing carbon powder to provide a reducing/non-oxidizing atmosphere. Table 4 shows the extent of $CH_4$ and $O_2$ conversion and product CO and $H_2$ selectivities for this Co—Cr foam.

EXAMPLE 19

15% (Ni, Mn/MgO)/NiMgO Washcoated Reticulated Foam

A NiO—MgO foam fired at 1600° C. was washcoated with 13% Ni, 3% Mn/MgO powder. In washcoating, the powder catalyst was first ground to less than 325 mesh and sufficient water was added to form a slurry. The preformed NiO—MgO foam was then dipped into the slurry and saturated for 5 minutes. The foam was removed from the slurry and dried at about 110° C. for 2 hrs, but not calcined. The elemental composition of this foam was similar to that given in Example 10. Test results are shown in Table 4.

When a representative Ni(O)—Mn(O)—MgO reticulated ceramic monolith (fired at 1000° C.) was tested (two pieces each 12 mm OD×10 mm H), performance and catalyst run temperature were steady over the 24 hr period, as shown in FIG. 1. The system pressure was approximately 8 psig. The bed temperature was approximately 820° C. Results were steady at approximately 90% $CH_4$ conversion, 98% CO selectivity and 97% $H_2$ selectivity. These data show that the active catalyst composition can serve as the reticulated foam support. Samples of NiO—MnO—MgO reticulated foam made at 1600° C. (the second, higher temperature calcination) were tested after being calcined, and very little conversion to CO and $H_2$ was detected in each case. The foam made at 1200° C. also gave little conversion when tested.

EXAMPLE 20

6%(Ni, Cr)/NiMgO Washcoated Reticulated Foam

A NiO—MgO foam fired at 1600° C. was washcoated with 6 wt % $Ni_{0.2}Cr_{0.8}Ox$ freeze dried powder, prepared as previously described in a reducing atmosphere. In washcoating, the powder catalyst was first ground to less than 325 mesh and sufficient water was added to form a slurry. The preformed NiO—MgO foam was then dipped into the slurry and saturated for 5 minutes. The foam was removed from the slurry and dried at about 110° C. for 2 hrs, but not calcined. Test results are shown in Table 4.

EXAMPLE 21

Ni,Cr/Co—Cr Oxide Washcoated Reticulated Foam

The Co—Cr oxide reticulated foam was prepared as described in Example 18. The foam was coated with $Ni_{0.2}Cr_{0.8}Ox$ by the wash coating technique described in Example 20. The foam was sintered or densified in a reducing atmosphere, as described in Example 18. After coating with the $Ni_{0.2}$ $Cr_{0.8}$ oxide precursor, it was heated at low temperatures to decompose the precursors on the preformed foam. Test results are shown in Table 4.

Test Procedure

Representative catalysts prepared as described in the foregoing Examples were tested in a reduced scale millisecond contact time reactor for their ability to convert a reactant gas mixture of $CH_4$, $O_2$, $N_2$ to synthesis gas. A 25 cm long quartz tube reactor was equipped with a co-axial, quartz thermocouple well, resulting in a 12.5 mm i.d. reactor. The void space within the reactor was packed with quartz chips. The catalyst bed, of compatible diameter (i.e., 12 mm OD), was positioned with quartz wool at approximately mid-length in the reactor. The foam monoliths were generally 8–10 mm in length, although in some cases two such pieces were stacked to provide a total catalyst bed length of 20 mm. A three point, K type, thermocouple was used with the catalyst's "hot spot", read-out temperature reported as the run temperature. The catalyst bed was heated with a 4 inch (10.2 cm), 600 W band furnace at 90% electrical output. Mass flow controllers and meters regulated the feed composition and flow rate. Prior to start-up, the flows were checked manually with a bubble meter and then the feed composition was reconfirmed by gas chromatographic analysis. The flow rates of all the meters were safety interlocked and their measurements were checked electronically by the mass flow meters every second. All runs were performed at a $CH_4$:$O_2$ feed ratio of 2:1, safely outside of the flammable region. The feed contained (in volume percent) 30% $CH_4$, 15% $O_2$ and 55% $N_2$ or 60% $CH_4$, 30% $O_2$ and 10% $N_2$. Experiments were conducted at 5 psig (136 kPa) or more, and a total flow rate of up to about 7.5 SLPM. The reactor effluent was analyzed by a gas chromatograph (g.c.) equipped with a thermal conductivity detector. The feed components (i.e., $CH_4$, $O_2$, $N_2$) and potential products (i.e., CO, $H_2$, $CO_2$, and $H_2O$) were all well resolved and reliably quantified by two chromatography columns in series consisting of 5A molecular sieve and Haysep T. Mass balances of C, H, and O all closed at 98–102%. Runs were conducted over two operating days, each with 6 hours of steady state, run time. The results of tests obtained with the representative 3-D catalyst structures in the reduced scale reactor runs are indicative of their applicability, when increased to industrial-scale dimensions, for commercial syngas production processes.

GHSV is gas hourly space velocity, i.e., liters of gas (measured at atmospheric pressure and 23° C.) fed per hour per liter of catalyst. The GHSV is generally calculated as follows:

$$GHSV=F_{tot}/V_{cat}$$

where $F_{tot}$ is the total reactant volumetric flowrate at standard conditions in $cm^3$/sec, and $V_{cat}$ is the volume of the catalyst reaction zone in $cm^3$. For example, the volume of the catalyst reaction zone is simply the volume of the cylinder (e.g., 12 mm in diameter×10 mm in length, or 1.2 $cm^3$). Thus, at a flowrate of 7.5 standard liters per minute (SLPM) (7,500 $cm^3$/min), the GHSV is calculated as follows:

$$GHSV(hr^{-1})=(7,500\ cm^3/min)/(1.2\ cm^3)\times(60\ min/hr)=549,000\ hr^{-1}.$$

At GHSVs of 100,000 $hr^{-1}$ or more the residence or contact time of the reactant gas mixture on the catalyst is very short (i.e., preferably less than about 10 milliseconds).

Expressed in terms of volume of gas per weight of catalyst (NL/kg/hr.), for monolith supported catalysts having densities ranging from about 0.5 kg/l to about 2.0 kg/l, a GHSV of about 10,000 to 200,000,000 hr–1 corresponds to about 20,000 to 100,000,000 normal liters of gas per kilogram of catalyst per hour (NL/kg/h).

From the results of testing the above-described compositions, it was determined by the inventors that the new reticulated ceramic monoliths have sufficient macroporosity to minimize back pressure when used on-stream, and possess better tortuosity and thermal heat resistance characteristics than conventional oxidation catalysts. These new structures also possess good mechanical strength for use at high volumetric flow rates on stream in such applications as reduced scale, high flow rate syngas production reactors, for extended periods of time. The comparative performance of representative reticulated foams, which were prepared according to some of the foregoing examples, are shown in Table 4. For the chromium oxide based foam materials, using a $Co_{0.2}$ $Cr_{0.8}$ oxide reticulated ceramic as a base material (Example 6 in Table 1, and the first entry in Table 4) appears to be superior to using the pure $Cr_2O_3$ foam base (last two entries in Table 1)

when $Ni_{0.2}$ $Cr_{0.8}$ oxides are supported on it. In Table 4, the $Ni_{0.2}$ $Cr_{0.8}$ Ox/$Co_{0.2}$ $Cr_{0.8}$ Ox foam is superior in performance to the performance of the pure $Co_{0.2}$ $Cr_{0.8}$ Ox foam (comparing the first and second rows of Table 4). Importantly, the sample prepared according to comparative Example 4 ($Co_{0.2}$ $Cr_{0.8}$ on cordierite honeycomb; Table 1 and Table 5) shows that not all 3-D supports are useful. In that case no activity was observed, as the system crashed on overtemp.

TABLE 4

Performance of Reticulated Foams[a]

| Catalyst | Temp (° C.) | SLMP | % $CH_4/O_2$ Conv. | % $CO/H_2$ Sel. | $H_2$:CO Ratio |
|---|---|---|---|---|---|
| Co—Cr foam[b] | 1117 | 2.5 | 46/100 | 78/62 | 1.60 |
| 0.1% $Ni_{0.2}Cr_{0.8}$/ Co—Cr foam[d] | 1161 | 2.5 | 70/100 | 93/88 | 1.89 |
| Mn/Ni/MgO foam[c] | | | | | |
| 15% (Ni, Mn, MgO)/ NiMgO foam[d] | 791 | 2.5 | 84/100 | 96/95 | 1.98 |
| | 875 | 5.0 | 89/100 | 98/97 | 1.98 |
| | 910 | 7.5 | 87/99 | 98/95 | 1.94 |
| 6% $Ni_{0.2}Cr_{0.8}$NiMgO foam[d] | 814 | 2.5 | 84/100 | 96/95 | 1.98 |
| | 926 | 5.0 | 88/100 | 97/95 | 1.96 |
| | 1011 | 7.5 | 88/100 | 97/96 | 1.98 |

[a]Feed: 60% $CH_4$, 30% $O_2$, 10% $N_2$
[b]Feed: 30% $CH_4$, 15% $O_2$, 55% $N_2$
[c]Only trace products detected
[d]Washcoated foam The $Co_{0.2}$ $Cr_{0.8}$ freeze-dried oxide as a reticulated foam gave 46% $CH_4$ conversion with 78% CO and 62% $H_2$ selectivities. The addition of a 0.1 wt % loading of $Ni_{0.2}$ $Cr_{0.8}$ Ox onto a reticulated foam comprised of $Co_{0.2}$ $Cr_{0.8}$ freeze-dried oxide improved the results to 70% $CH_4$ conversion, 93% CO selectivity and 88% $H_2$ selectivity. The Ni(O), Mn(O), MgO material as a reticulated foam, gave $CH_4$ conversions approaching 90% and syngas selectivities in the upper 90s (as shown in FIG. 1). Results improved significantly on adding a 15 wt % wash coating of Ni(O), Mn(O), MgO onto the corresponding NiMgO reticulated foam (fired at 1600° C.), as shown in Table 4, compared to a bare NiO—MnO—MgO foam made at 1600° C., which gave very little conversion to CO and $H_2$ (see the discussion in Example 19). The wash coating of 6 wt % $Ni_{0.2}$ $Cr_{0.8}$ onto the reticulated foam of Ni(O) MgO (fired at 1600° C.) gave up to 88% $CH_4$ conversion, 97% CO selectivity, and 96% $H_2$ selectivity. In general, as the total flow increased from 2.5 to 7.5 SLPM, the temperature increased along with performance.

The NiO—MnO—MgO foams fired at 1600° C., while themselves serving as poor catalysts for converting $CH_4$ to CO and $H_2$, proved to be very good supports for the wash coated active catalyst materials, thereby yielding very active supported catalysts. These higher temperature treated ceramic foams are expected to tolerate higher on-stream temperatures and pressures than the corresponding NiO—MnO—MgO foams sintered at lower temperatures (e.g., 1000° C. and below), as well as many other conventional three-dimensional catalyst compositions.

The most preferred reticulated ceramic structures, prepared by impregnating organic polymer foams as described above, and/or by loading such non-poisoning reticulated supports with catalytically active material demonstrated superior conversion levels and selectivities (for syngas products) when compared to catalysts loaded on various commercially-available supports, as shown in Table 5.

TABLE 5

Comparative Performance of Other 3-D Catalysts[a]

| Catalyst | Temp (° C.) | SLMP | % $CH_4/O_2$ Conv. | % $CO/H_2$ Sel. | $H_2$:CO Ratio |
|---|---|---|---|---|---|
| 6.5% $Ni_{0.2}Cr_{0.8}$Ox/ honeycomb | 1178 | 2.5 | 51/87 | 90/84 | 1.87 |
| 9% $Co_{0.2}Cr_{0.8}$Ox/ honeycomb[b] | | | | | |
| 12% $Co_{0.2}Cr_{0.8}$Ox/ PSZ | 800 | 2.5 | 83/100 | 96/96 | 2.00 |
| 9% $MgCo_2O_4$/PSZ | 913 | 2.5 | 80/100 | 96/92 | 1.92 |
| 12% $CoAl_2O_4$/PSZ | 814 | 2.5 | 82/99 | 96/93 | 1.94 |
| 13% (Ni, Mn, MgO)/ PSZ | 917 | 2.5 | 83/100 | 97/95 | 1.96 |
| 14% (Ni, Mn, MgO)/ honeycomb[c] | 806 | 2.5 | 83/100 | 96/94 | 1.96 |
| | 973 | 5.0 | 84/99 | 97/92 | 1.90 |
| Ni ExMet Gauze | 1065 | 2.5 | 78/100 | 95/71 | 1.92 |

PSZ = partially stabilized zirconia
[a]Feed: 60% $CH_4$, 30% $O_2$, 10% $N_2$
[b]System crashed on overtemp.
[c]Honeycomb coated with 4% MgO To achieve better thermal balance and to prevent uncontrolled exotherms, mixed catalytic beds containing two or more reticulated ceramic monoliths (of different catalyst concentration or composition), prepared as described in the Examples, may be employed to obtain longer, graded composition catalyst beds. In arranging the monoliths which constitute the catalyst bed, a monolithic composition leading to a more exothermic process (e.g., $CO_2$ and $H_2O$ formation) is placed nearest the reactant gas entry point, and is followed by a monolith containing an endothermic reforming catalyst. For example, more strongly oxidizing, catalytic three-dimensional forms are positioned on top of the bed, followed by three-dimensional forms that catalyze reforming.

Although the preferred method of preparing the metal oxide powders for use in making the new reticulated foam catalysts includes freeze drying the metal salt solutions, satisfactory catalyst powders may also be made by any of various other techniques that have been customarily used to prepare catalyst powders and have been described in the literature. For example, xerogel or aerogel formation, spray drying or spray roasting techniques. In any case, however, it is important that when the monolith-forming material includes chromium oxide, reducing conditions are required for the densification or sintering steps of preparing the ceramic foam. Preferably the reticulated foam catalysts have about 65–80 pores per inch.

The new reticulated ceramics, as exemplified above, in the form of three-dimensional monoliths have sufficient macroporosity to minimize back pressure when used on-stream, and possess better tortuosity and thermal heat resistance characteristics than conventional oxidation catalysts with non-3-dimensional forms. The new structures also possess good mechanical strength for use at high volumetric flow rates on stream in such applications as reduced scale, high space velocity syngas production reactors.

Process of Producing Syngas

A feed stream comprising a light hydrocarbon feedstock, such as methane, and an oxygen-containing gas is contacted with a reticulated foam catalyst prepared as described in one of the foregoing Examples. Alternatively, an active catalyst material supported by a non-poisoning reticulated foam, prepared as described in one of the foregoing examples, is used. Preferably a millisecond contact time reactor is employed, equipped for either axial or radial flow of reactant and product gases. Several schemes for carrying out catalytic partial oxidation (CPOX) of hydrocarbons in a short contact time reactor have been described in the literature. For example, L. D. Schmidt and his colleagues at the University of Minnesota describe a millisecond contact time reactor in U.S. Pat. No. 5,648,582 and in *J. Catalysis* 138, 267–282 (1992) for use in the production of synthesis gas by direct oxidation of methane over a catalyst such as platinum or rhodium. A general description of major considerations involved in operating a reactor using millisecond contact times is given in U.S. Pat. No. 5,654,491. The disclosures of the above-mentioned references are incorporated herein by reference.

The hydrocarbon feedstock may be any gaseous hydrocarbon having a low boiling point, such as methane, natural gas, associated gas, or other sources of light hydrocarbons having from 1 to 5 carbon atoms. The hydrocarbon feedstock may be a gas arising from naturally occurring reserves of methane which contain carbon dioxide. Preferably, the feed comprises at least 50% by volume methane, more preferably at least 75% by volume, and most preferably at least 80% by volume methane.

The hydrocarbon feedstock is in the gaseous phase when contacting the catalyst. The hydrocarbon feedstock is contacted with the catalyst as a mixture with an oxygen-containing gas, preferably pure oxygen. The oxygen-containing gas may also comprise steam and/or $CO_2$ in addition to oxygen. Alternatively, the hydrocarbon feedstock is contacted with the catalyst as a mixture with a gas comprising steam and/or $CO_2$. It is preferred that the methane-containing feed and the oxygen-containing gas are mixed in such amounts to give a carbon (i.e., carbon in methane) to oxygen (i.e., oxygen) ratio from about 1.25:1 to about 3.3:1, more preferably, from about 1.3:1 to about 2.2:1, and most preferably from about 1.5:1 to about 2.2:1, especially the stoichiometric ratio of 2:1. The process is operated at atmospheric or superatmospheric pressures, the latter being preferred. The pressures may be from about 100 kPa to about 12,500 kPa, preferably from about 130 kPa to about 10,000 kPa. The process is preferably operated at temperatures of from about 600° C. to about 1200° C., preferably from about 700° C. to about 1100° C. The hydrocarbon feedstock and the oxygen-containing gas are preferably pre-heated before contact with the catalyst. The hydrocarbon feedstock and the oxygen-containing gas are passed over the catalyst at any of a variety of space velocities. Gas hourly space velocities (GHSV) for the process, stated as normal liters of gas per kilogram of catalyst per hour, are from about 20,000 to about 100,000,000 NL/kg/h, preferably from about 50,000 to about 50,000,000 NL/kg/h. Preferably the catalyst is employed in a millisecond contact time reactor for syngas production. The process preferably includes maintaining a catalyst residence time of no more than 10 milliseconds for the reactant gas mixture. Residence time is the inverse of the space velocity, and high space velocity equates to low residence time on the catalyst. The product gas mixture emerging from the reactor is harvested and may be sampled for analysis of products, including $CH_4$, $O_2$, CO, $H_2$ and $CO_2$. And, if desired, may be routed directly into a variety of applications. One such application is for producing higher molecular weight hydrocarbon components using Fisher-Tropsch technology.

While the preferred embodiments of the invention have been shown and described, modifications thereof can be made by one skilled in the art without departing from the spirit and teachings of the invention. The embodiments described herein are exemplary only, and are not intended to be limiting. For example, pure methane was employed in the representative test procedures, however, any light hydrocarbon (i.e., $C_1$–$C_5$) gaseous feedstock could also serve as a feedstock for the net partial oxidation reaction catalyzed by the new reticulated foam catalysts. Also, the reticulated ceramic materials described herein may also have activity in various chemical oxidations other than methane oxidation to synthesis gas.

Any variations and modifications of the invention disclosed herein are possible and are within the scope of the invention. For example, the foam structure described by the inventors is only one of the workable monolithic configurations which the reticulated catalysts and non-poisoning supports may assume, and which will provide the requisite porosity and mechanical strength to the bed. Accordingly, the scope of protection is not limited by the description set out above, but is only limited by the claims which follow, that scope including all equivalents of the subject matter of the claims. The disclosures of U.S. Provisional Application No. 60/183,576 and all patents and publications cited herein are incorporated by reference.

What is claimed is:

1. A method of converting a $C_1$–$C_5$ hydrocarbon to a product gas mixture containing CO and $H_2$, the process comprising mixing a $C_1$–$C_5$ hydrocarbon-containing feedstock and an oxygen-containing feedstock to provide a reactant gas mixture;

contacting said reactant gas mixture with a catalytically effective amount of a catalyst comprising at least one macroporous reticulated ceramic monolith containing chromium oxide; and maintaining catalytic partial oxidation reaction promoting conditions, said monolith prepared by a process comprising calcining in a non-oxidizing atmosphere.

2. The method of claim 1 wherein said step of maintaining catalytic partial oxidation reaction promoting conditions comprises, during said contacting, maintaining said catalyst structure and said reactant gas mixture at a temperature of about 600–1,100° C.

3. The method of claim 1 wherein said step of maintaining catalytic partial oxidation reaction promoting conditions comprises, during said contacting, maintaining said catalyst structure and said reactant gas mixture at a pressure of about 100–12,500 kPa.

4. The method of claim 1 wherein said step of maintaining catalytic partial oxidation reaction promoting conditions comprises passing said reactant gas mixture over said composition at a continuous space velocity of at least about 20,000 to about 100,000,000 NL/kg/h.

5. The method of claim 4 wherein said step of passing said reactant gas mixture over said catalyst comprises passing said mixture at a gas hourly space velocity of about 50,000 to about 50,000,000 NL/kg/h.

6. The method of claim 1 wherein said step of maintaining catalytic partial oxidation reaction promoting conditions comprises maintaining a contact time of less than about 10 milliseconds between said reactant gas mixture and said catalyst.

7. The method of claim 1 wherein said reticulated ceramic monolith further comprises at least one catalytically active metal or metal oxide chosen from the group consisting of cobalt, nickel, manganese, molybdenum, tungsten, tin, rhenium, bismuth, indium and phosphorus, and oxides thereof.

8. The method of claim 1 wherein said catalyst further comprises least one metal or metal oxide capable of catalyzing an oxidation reaction chosen from the group consisting of chromium, cobalt, nickel, alkaline earth metals, rare earth metals, manganese, molybdenum, tungsten, tin, rhenium, bismuth, indium and phosphorus, and oxides thereof, supported on said reticulated ceramic monolith.

9. The method of claim 1 wherein said mixing comprises mixing a methane-containing feedstock and an oxygen-containing feedstock to provide a reactant gas mixture feedstock having a carbon:oxygen ratio of about 1.25:1 to about 3.3:1.

10. The method of claim 1 wherein said oxygen-containing feedstock further comprises steam, $CO_2$, or a combination thereof.

11. The method of claim 1 wherein said mixing comprises mixing a hydrocarbon feedstock and a gas comprising steam and/or $CO_2$ to provide said reactant gas mixture.

12. The method of claim 1 wherein said $C_1$–$C_5$ hydrocarbon comprises at least about 50% methane by volume.

13. The method of claim 1 wherein said $C_1$–$C_5$ hydrocarbon comprises at least about 80% methane by volume.

14. The method of claim 1 further comprising preheating said reactant gas mixture.

15. The method of claim 1 wherein said catalyst comprises the product of the process comprising:
drying an aqueous solution of at least one metal salt chosen from the group consisting of salts of chromium, cobalt, nickel, manganese, molybdenum, tungsten, tin, rhenium, bismuth, indium and phosphorus to yield a dried active catalyst or catalyst precursor material;
calcining said active catalyst or catalyst precursor material to yield a calcined catalyst or catalyst precursor material;
sizing said calcined material to yield an active catalyst or catalyst precursor powder comprising particles of predetermined average size;
preparing a solution or slurry containing said powder;
impregnating a pore-templating material with said solution or slurry;
drying said impregnated pore-templating material;
calcining said dry impregnated material at a first temperature to produce a green reticulated ceramic;
calcining said green reticulated ceramic at a second temperature higher than said first temperature sufficient to produce sintering of said ceramic, such that a catalytically active reticulated ceramic monolith is produced.

16. The method of claim 1 wherein each said monolith has sufficient mechanical strength to withstand gas pressure up to about 12,500 kPa and temperatures up to about 1200° C., and has sufficient macroporosity to permit a space velocity of reactant and product gases up to at least about 100,000,000 NL/kg/h.

17. The method of claim 16 wherein each said monolith contains about 65–80 pores per inch.

18. The method of claim 16 wherein each said monolith has a surface area of about 5–250 m²/g.

19. The method of claim 16 wherein said catalyst comprises an active catalytic component containing at least one sinterable metal or metal oxide chosen from the group consisting of chromium, cobalt, nickel, manganese, molybdenum, tungsten, tin, rhenium, bismuth, indium and phosphorus, alkaline earth metals and rare earth metals, and oxides thereof.

20. The method of claim 19 wherein said catalyst comprises nickel oxide.

21. The method of claim 19 wherein said catalyst comprises manganese oxide.

22. The method of claim 19 wherein said catalyst comprises magnesium oxide.

23. The method of claim 19 wherein said catalyst comprises cobalt oxide.

24. The method of claim 19 wherein said catalyst comprises nickel oxide, manganese oxide, and magnesium oxide.

25. The method of claim 20 wherein said catalyst comprises nickel oxide and cobalt oxide.

26. The method of claim 15 wherein said solution or slurry comprises at least one sinterable metal oxide capable of catalyzing an oxidation reaction.

27. The method of claim 26 wherein said at least one sinterable metal oxide is chosen from the group consisting of oxides of chromium, cobalt, nickel, alkaline earth elements and rare earth elements.

28. The method of claim 15 further comprising maintaining said ceramic in a non-oxidizing atmosphere during said higher temperature calcining.

29. The method of claim 15 wherein said impregnated material comprises a chromium salt and/or chromium oxide and said second calcining step comprises maintaining said ceramic in a non-oxidizing atmosphere during said calcining, said non-oxidizing atmosphere chosen from the group consisting of a vacuum, a hydrogen gas atmosphere, an inert gas atmosphere, and an atmosphere comprising a combination of hydrogen and at least one inert gas.

30. The method of claim 15 wherein said step of impregnating a pore-templating material with said powder-metal oxide solution or slurry comprises impregnating an organic polymer foam substrate.

31. The method of claim 15 wherein said step of calcining said dry impregnated material to yield a ceramic foam precursor is conducted at a temperature of no more than about 1000° C.

32. The method of claim 15 wherein said step of calcining said ceramic at a second temperature sufficient to produce sintering comprises heating to a temperature of about 1500–1600° C.

33. The method of claim 15 wherein said step of preparing a solution or slurry comprises including at least one additional component chosen from the group consisting of a dispersant, a binder, and a wetting agent.

34. The method of claim 15 wherein when said step of preparing a solution or slurry comprises including a chromium-containing compound, and said method further comprises maintaining said ceramic in a non-oxidizing atmosphere during said higher temperature calcining step.

35. The method of claim 15 wherein said step of sizing said calcined material comprises reducing said active catalyst or catalyst precursor material to particles less than about 325 mesh.

36. The method of claim 35 wherein said step of sizing said calcined material comprises reducing said active catalyst or catalyst precursor material to about 20–30 mesh particles.

37. The method of claim 15, wherein the catalyst comprises a reticulated ceramic foam catalyst.

38. The method of claim 1, wherein the catalyst comprises a reticulated ceramic foam catalyst.

39. A method of converting a $C_1$–$C_5$ hydrocarbon to a product gas mixture containing CO and $H_2$, the process comprising:
contacting a reactant gas mixture comprising a $C_1$–$C_5$ hydrocarbon and an oxygen-containing gas with at least one supported catalyst structure comprising an active catalytic component disposed on a non-poisoning reticulated ceramic support, said active catalytic component comprising at least one metal or metal oxide selected from the group consisting of chromium, cobalt, nickel, manganese, molybdenum, tungsten, tin, rhenium, bismuth, indium, phosphorus, alkaline earth metals, rare earth metals, and oxides thereof, and said support structure comprising magnesium oxide or chromium oxide, wherein said chromium oxide-containing support structure is prepared by a process comprising calcining said support structure under non-oxidizing conditions;

during said contacting, maintaining said catalyst structure and said reactant gas mixture at a temperature of about 600–1,100° C.;

during said contacting, maintaining said catalyst structure and said reactant gas mixture at a pressure of about 100–12,500 kPa; and passing said reactant gas mixture over said composition at a continuous flow rate of about 20,000 to about 100,000,000 NL/kg/h.

40. The method of claim 39 wherein said active catalytic component comprises 0.1 wt % $Ni_xCr_y$ Ox and said support comprises a chromium oxide foam, wherein the subscript x is an atomic ratio of 0.2 and the subscript y is an atomic ratio of 0.8.

41. The method of claim 39 wherein said support comprises cobalt oxide and chromium oxide foam.

42. The method of claim 39 wherein said active catalytic component comprises 15 wt % of a composition containing 13 wt % Ni (O), 3 wt % Mn(O), 84 wt % Mg(O), and said support comprises NiO—MgO foam.

43. The method of claim 39 wherein said active catalytic component comprises 6 wt % $Ni_xCr_y$ Ox and said support comprises NiO—MgO foam, wherein the subscript x is an atomic ratio of 0.2 and the subscript y is an atomic ratio of 0.8.

44. The method of claim 39 wherein said active catalytic component and said non-poisoning reticulated support comprise the same or a different composition.

* * * * *